(12) United States Patent
Kobayashi

(10) Patent No.: US 9,690,430 B2
(45) Date of Patent: Jun. 27, 2017

(54) TOUCH DETECTION APPARATUS, TOUCH DETECTION METHOD AND RECORDING MEDIUM

(71) Applicant: CANON KABUSHIKI KAISHA, Tokyo (JP)

(72) Inventor: Kiwamu Kobayashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 387 days.

(21) Appl. No.: 13/936,923

(22) Filed: Jul. 8, 2013

(65) Prior Publication Data

US 2014/0015950 A1    Jan. 16, 2014

(30) Foreign Application Priority Data

Jul. 12, 2012    (JP) ................................ 2012-156904

(51) Int. Cl.
*G06F 3/042* (2006.01)

(52) U.S. Cl.
CPC .......... *G06F 3/0428* (2013.01); *G06F 3/0425* (2013.01)

(58) Field of Classification Search
CPC ....... G06F 3/042; G06F 3/0428; G06F 3/0425
USPC .......................................................... 348/77
See application file for complete search history.

(56) References Cited

U.S. PATENT DOCUMENTS

| | | |
|---|---|---|
| 4,886,943 A | 12/1989 | Suzuki et al. |
| 4,887,245 A | 12/1989 | Mori et al. |
| 4,910,363 A | 3/1990 | Kobayashi et al. |
| 4,931,965 A | 6/1990 | Kaneko et al. |
| 4,980,518 A | 12/1990 | Kobayashi et al. |
| 5,070,325 A | 12/1991 | Tanaka et al. |
| 5,097,102 A | 3/1992 | Yoshimura et al. |
| 5,142,106 A | 8/1992 | Yoshimura et al. |
| 5,239,138 A | 8/1993 | Kobayashi et al. |
| 5,500,492 A | 3/1996 | Kobayashi et al. |
| 5,539,678 A | 7/1996 | Tanaka et al. |
| 5,565,893 A | 10/1996 | Sato et al. |
| 5,714,698 A | 2/1998 | Tokioka et al. |
| 5,726,686 A | 3/1998 | Taniishi et al. |
| 5,736,979 A | 4/1998 | Kobayashi et al. |
| 5,805,147 A | 9/1998 | Tokioka et al. |
| 5,818,429 A | 10/1998 | Tanaka et al. |

(Continued)

FOREIGN PATENT DOCUMENTS

| | | |
|---|---|---|
| JP | 2000-081950 A | 3/2000 |
| JP | 2001-043021 A | 2/2001 |

(Continued)

OTHER PUBLICATIONS

U.S. Appl. No. 13/948,380, filed Jul. 23, 2013 by Machii et al.

(Continued)

*Primary Examiner* — Thai Tran
*Assistant Examiner* — Nien-Ru Yang
(74) *Attorney, Agent, or Firm* — Fitzpatrick, Cella, Harper & Scinto

(57) ABSTRACT

A touch detection method executed by a touch detection apparatus projects light that does not include a wavelength component of visible light onto a screen, has a sensitivity in a wavelength component of the light projected by the projecting, takes an image on the screen in a state where light is projected by the projecting, and performs detection pertaining to a touch, based on image data taken by the image-sensing.

10 Claims, 15 Drawing Sheets

(56) References Cited

U.S. PATENT DOCUMENTS

| | | | |
|---|---|---|---|
| 5,831,603 A | 11/1998 | Yoshimura et al. | |
| 5,936,207 A | 8/1999 | Kobayashi et al. | |
| 6,415,240 B1 | 7/2002 | Kobayashi et al. | |
| 6,636,199 B2 | 10/2003 | Kobayashi | |
| 6,798,926 B2 | 9/2004 | Hiramatsu | |
| 6,862,019 B2 | 3/2005 | Kobayashi et al. | |
| 7,075,524 B2 | 7/2006 | Kobayashi et al. | |
| 7,119,788 B2 | 10/2006 | Gomi et al. | |
| 7,486,281 B2 | 2/2009 | Kobayashi et al. | |
| 7,538,894 B2 | 5/2009 | Kobayashi | |
| 7,965,904 B2 | 6/2011 | Kobayashi | |
| 2008/0013826 A1 | 1/2008 | Hillis et al. | |
| 2008/0055266 A1* | 3/2008 | Harada | G06F 3/0421 345/173 |
| 2010/0097349 A1* | 4/2010 | Kim | G06F 3/042 345/175 |
| 2010/0238138 A1* | 9/2010 | Goertz | G06F 3/042 345/175 |
| 2011/0164114 A1 | 7/2011 | Kobayashi et al. | |
| 2011/0234542 A1* | 9/2011 | Marson | G06F 3/0418 345/175 |
| 2011/0242054 A1* | 10/2011 | Tsu | G06F 3/0426 345/175 |
| 2012/0154408 A1* | 6/2012 | Yukawa | G06F 1/1601 345/473 |
| 2013/0234955 A1 | 9/2013 | Takano et al. | |
| 2013/0238124 A1 | 9/2013 | Suzuki et al. | |
| 2013/0257814 A1 | 10/2013 | Kobayashi et al. | |

FOREIGN PATENT DOCUMENTS

| | | |
|---|---|---|
| JP | 2001-236179 A | 8/2001 |
| JP | 2004-265185 A | 9/2004 |
| JP | 2004-272353 A | 9/2004 |
| JP | 2008-059253 A | 3/2008 |
| JP | 2011-118533 A | 6/2011 |

OTHER PUBLICATIONS

U.S. Appl. No. 13/973,651, filed Aug. 22, 2013 by Matsushita et al.
Japanese Office Action dated Apr. 26, 2016 in Japanese Application No. 2012156904.

* cited by examiner

FIG. 6

REGION EXPANSION FILTER

REGION DIMINUTION FILTER

TOUCH DETECTION APPARATUS, TOUCH DETECTION METHOD AND RECORDING MEDIUM

BACKGROUND OF THE INVENTION

Field of the Invention

The present invention relates to technologies for detecting touched positions and touchdown.

Description of the Related Art

Conventionally, arranging some devices on a screen as a projection target enables touch input when performing the touch input through an image projected by a projector. Japanese Patent Application Laid-Open Nos. 2004-272353 and 2001-43021 disclose techniques for coordinates input and touch determination, the techniques comprising: arranging means for projecting infrared rays and means for receiving the infrared rays on a screen; and detecting fingers interrupting the infrared rays by using these means so as to perform the coordinates input and the touch determination. Meanwhile, Japanese Patent Application Laid-Open Nos. 2001-236179, 2004-265185 and 2000-81950 disclose techniques of inputting indication through an image projected by a projector without arranging any device on a screen. Unfortunately, the techniques disclosed in these documents require a dedicated pointing device. The pointing device emits light or ultrasonic waves, which is detected in proximity to a projection area or at a position apart from the screen, thereby enabling coordinates input and touch determination.

A projector, which is regarded as one of display devices, has an advantage of capability of projection onto any place, in comparison with a flat panel type display device, e.g., a liquid crystal display device. The feature of "capability of projection onto any place" is incompatible with the requirement of "arranging some devices on a screen", which hinders its convenience. Likewise, the feature of "capability of projection onto any place" is incompatible with the requirement of "a dedicated pointing device", which also hinders its convenience. For compatibility therebetween, Japanese Patent Application Laid-Open No. 2011-118533 discloses a technique of touch input, the technique comprising detecting shadows of hands or fingers using a camera arranged on a side of a projector. The disclosed technique detects a touched position and determines a touchdown when a user touches a certain position on a projected image with a hand.

In the technique disclosed in Japanese Patent Application Laid-Open No. 2011-118533, however, the detection of the touched position and determination of the touchdown are performed based on a relationship between a real image of a hand illuminated with projection light and a shadow image of the hand generated by the projection light. If there is a black region in the projected image, no effective light beam can be obtained in the region using this technique, and consequently the shadow image and the real image cannot be sufficiently obtained. Accordingly, the touched position and touchdown cannot be correctly detected by the disclosed technique.

Thus, it is an object of the present invention to reliably obtain a shadow image and to correctly detect pertaining to a touch.

SUMMARY OF THE INVENTION

A touch detection apparatus of the present invention comprises: a lighting unit configured to project light including invisible wavelength components onto a screen; an image sensing unit configured to have a sensitivity to wavelength components of the light projected from the lighting unit, and to take images of regions of the screen on which the light is being projected by the lighting unit; and a detection unit configured to detect a touch pertaining to the screen based on images taken by the image sensing unit.

The present invention enables to reliably obtain a shadow image and to correctly detect a touch.

Further features of the present invention will become apparent from the following description of exemplary embodiments with reference to the attached drawings.

BRIEF DESCRIPTION OF THE DRAWINGS

FIG. 6 is a diagram illustrating relationship between lighting patterns and indication directions.

DESCRIPTION OF THE EMBODIMENTS

Preferred embodiments of the present invention will now be described in detail in accordance with the accompanying drawings.

Exemplary embodiments to which the present invention is applied will hereinafter be described in detail with reference to accompanying drawings. Configurations described in the following embodiments are only examples of the present invention. The present invention is not limited to the following embodiments.

Figure 1:
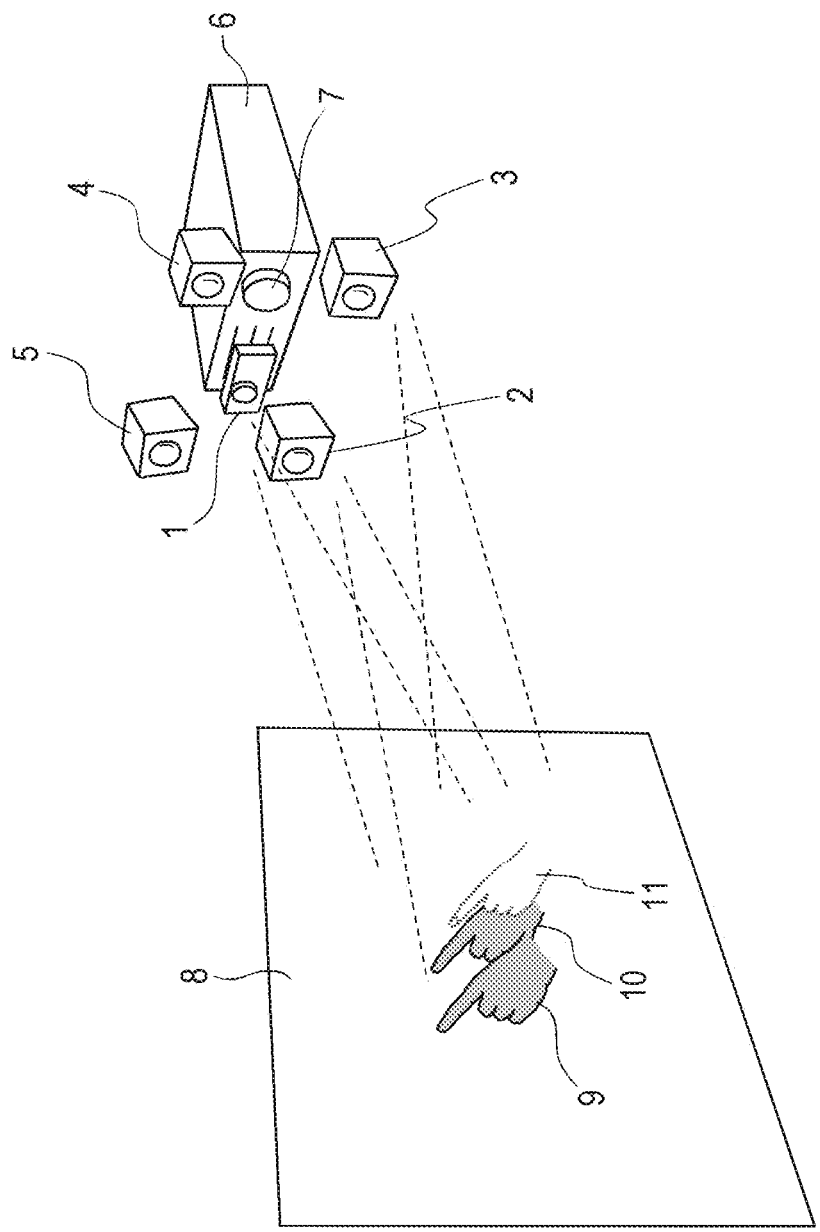
FIG. 1 is a diagram illustrating a configuration of an image projecting system according to a first embodiment of the present invention.

A first embodiment of the present invention will now be described. FIG. 1 is a diagram illustrating a configuration of an image projecting system according to the first embodiment of the present invention. As illustrated in FIG. 1, the image projecting system according to this embodiment includes an image sensing device 1, lighting devices 2 to 5 and a projector 6. The image sensing device 1 and the lighting devices 2 to 5 are arranged in proximity to an image projecting unit 7 of the projector 6. The image projecting system according to this embodiment is an example of a touch detection apparatus.

A screen 8 is a target on which an image is projected by the image projecting unit 7 of the projector 6, and is a target area of touch input. An imaging area of the image sensing device 1 and illumination areas of the lighting devices 2 to 5 include a part or the entire parts of the screen 8. The lighting devices 2 to 5 project light that does not include wavelength components of visible light. Here, it is assumed that the lighting devices 2 to 5 project infrared rays. However, the light is not limited thereto. The light may be any type of invisible light.

The image sensing device 1 has sensitivity at least for a part of or the entire wavelength bands of the infrared rays projected by the lighting devices 2 to 5. The present invention does not limit whether the wavelength characteristics of the image sensing device 1 includes a visible region or not. In the case with no visible region, the device is more robust against ambient light. On the contrary, in the case of including a visible region, an image projected by the image projecting unit 7 can be captured. Accordingly, closer cooperation can be achieved between the projected image and touch input.

Shadow images 9 and 10 of a hand imaged on the screen 8 in FIG. 1 are based on invisible light, and are actually invisible to a person, but observed by the image sensing device 1. That is, the invisible light projected by the lighting devices 2 to 5 and all shadows caused by the invisible light do not disturb a display of an image projected on the screen 8 by the projector 6 at all.

Figure 2:
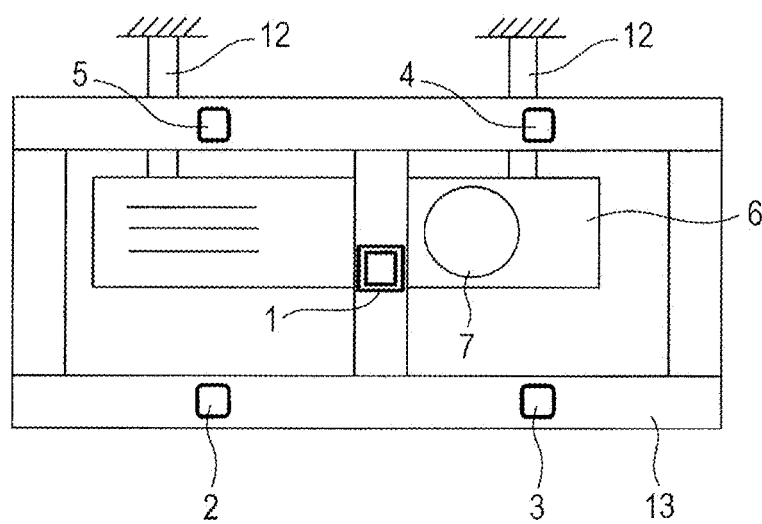
FIG. 2 is a diagram illustrating an appearance configuration of the image projecting system according to the embodiment of the present invention in front view from a screen side.

FIG. 2 is a diagram illustrating an appearance configuration of the image projecting system according to this embodiment in front view from the screen side. As illustrated in FIG. 2, for instance, the image projecting system according to this embodiment is installed in a manner suspended from a ceiling. The image sensing device 1 and the lighting devices 2 to 5 are fixed to each other by a supporter 13. The supporter 13 is fixed together with the projector 6 to a ceiling fastener 12.

Figure 3:
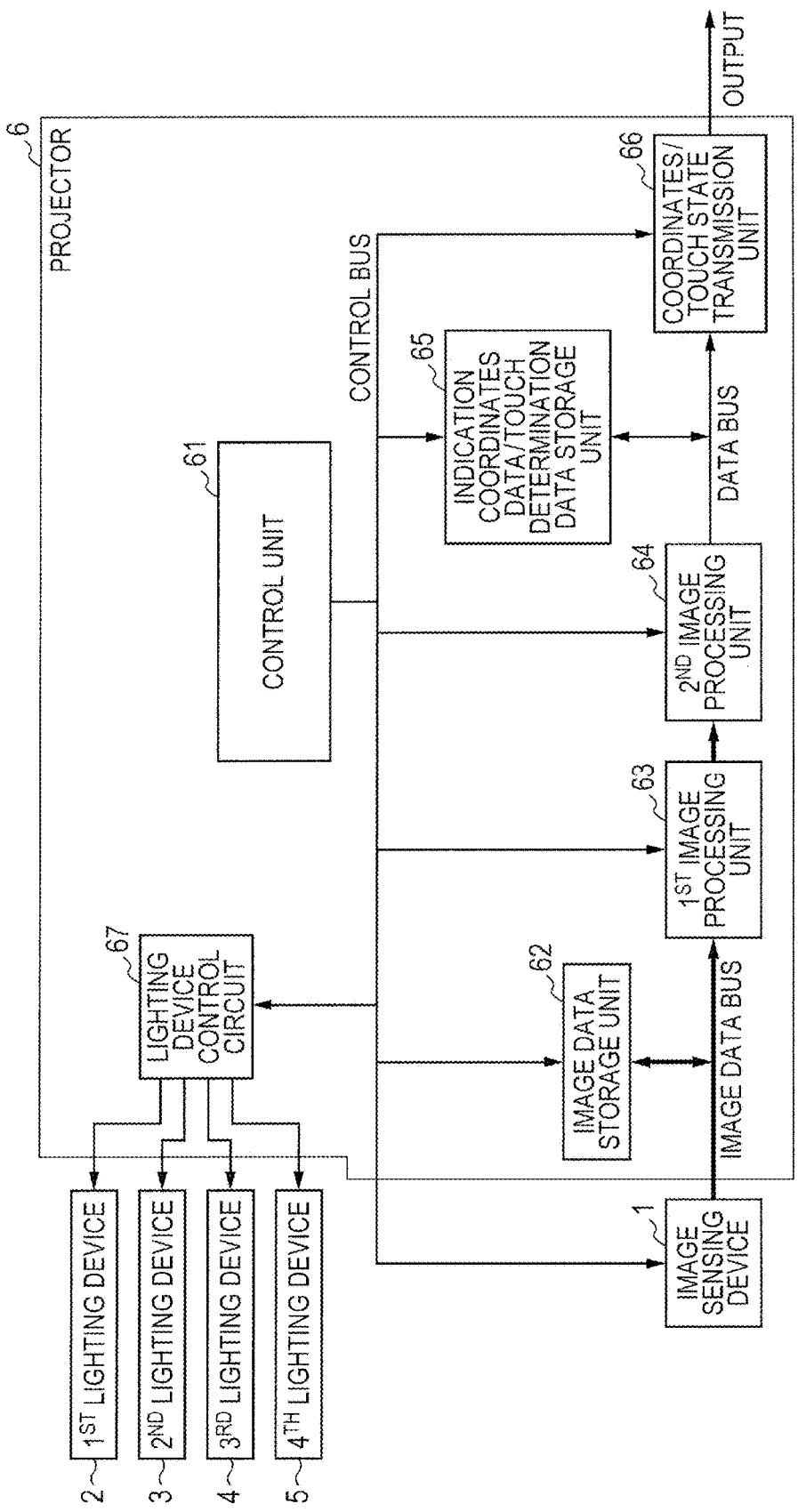
FIG. 3 is a diagram illustrating an internal configuration of a projector.

FIG. 3 is a diagram illustrating an internal configuration of the projector 6. As illustrated in FIG. 3, the projector 6 includes a control unit 61, an image data storage unit 62, a first image processing unit 63, a second image processing unit 64, an indication coordinates data/touch determination data storage unit 65, a coordinates/touch state transmission unit 66 and a lighting device control circuit 67, which are connected to each other via a control bus. The control unit 61 controls each configurational element connected to the control bus. The first to fourth lighting devices 2 to 5 are controlled and driven by the lighting device control circuit 67.

Image data taken by the image sensing device 1 is temporarily stored in the image data storage unit 62, subsequently output to the first image processing unit 63 and, in turn, output to the second image processing unit 64. The image data is exchanged via an image data bus. The second image processing unit 64 calculates indication coordinates data and touch determination data, based on image data input via the first image processing unit 63. The calculated indication coordinates data and touch determination data are temporarily stored in the indication coordinates data/touch determination data storage unit 65 and then transmitted by the coordinates/touch state transmission unit 66. The destination of the indication coordinates data and the touch determination data is one of a PC, a smart terminal and the projector 6 itself, and transmitted in a wireless or wired manner. The control unit 61 reads necessary programs and data from a recording medium, not illustrated, and executes the programs, thereby realizing after-mentioned processes of a flowchart illustrated in FIG. 5.

FIGS. 4A to 4D are diagrams illustrating an example of image data taken by the image sensing device 1. The shadow images 9 and 10 illustrated in FIGS. 4A to 4D are taken by the image sensing device 1 based on invisible light, and thus invisible to a person.

Figure 4C:
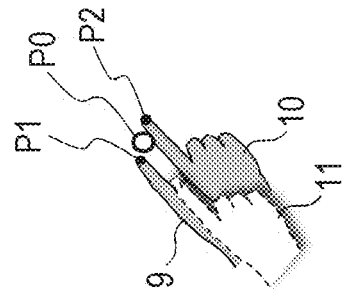
FIGS. 4A, 4B, 4C and 4D are diagrams illustrating an example of image data taken by an image sensing device.
Figure 4D:
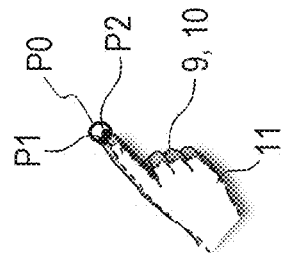
Figure 4B:
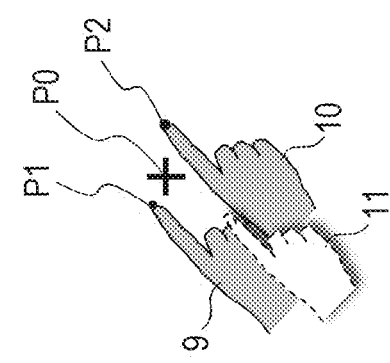
Figure 4A:
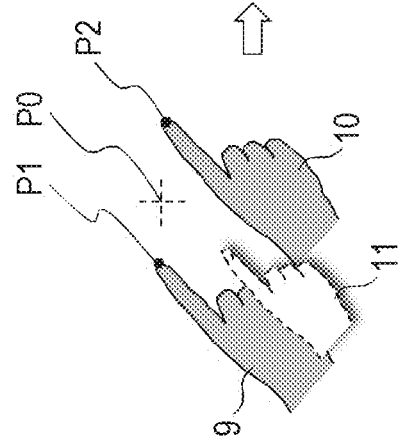

First, when a user extends a hand above the screen 8, image data illustrated in FIG. 4A is taken by the image sensing device 1. The second image processing unit 64 analyzes the image data illustrated in FIG. 4A, detects two distal positions P1 and P2 of the hand, and calculates, for instance, the midpoint P0 between the positions as indication coordinates, and the distance d between the positions P1 and P2. As the user brings the hand close to the screen 8, two shadow images of the hand become close to each other and the distance d between the positions P1 and P2 becomes short. As illustrated in FIG. 4B, when the distance d reaches a first threshold or becomes shorter, the second image processing unit 64 determines "presence of coordinate input" and outputs a coordinate value P0. Furthermore, when the two shadow images become closer to each other, as illustrated in FIGS. 4C or 4D, and the distance d reaches a second threshold or becomes shorter, the second image processing unit 64 determines "presence of touchdown". An example illustrated in FIG. 4C is a case where the second threshold has a relatively large value. In this case, when the hand approaches the screen 8 at a certain extent, it is determined as "presence of touchdown". On the other hand, an example illustrated in FIG. 4D is a case where the second threshold is approximately zero. In this case, when the hand comes nearly into contact with the screen 8, it is determined as "presence of touchdown".

Setting as illustrated in FIG. 4C is used for a case where the screen surface is not intended to be in contact. For instance, in the case of manipulation during surgical treatment, such as an operation, is applied, an aseptic state is required. Accordingly, such setting is configured. On the contrary, setting as illustrated in FIG. 4D is used in the case where physical senses of actual manipulation onto the screen 8 are imparted.

Figure 5:
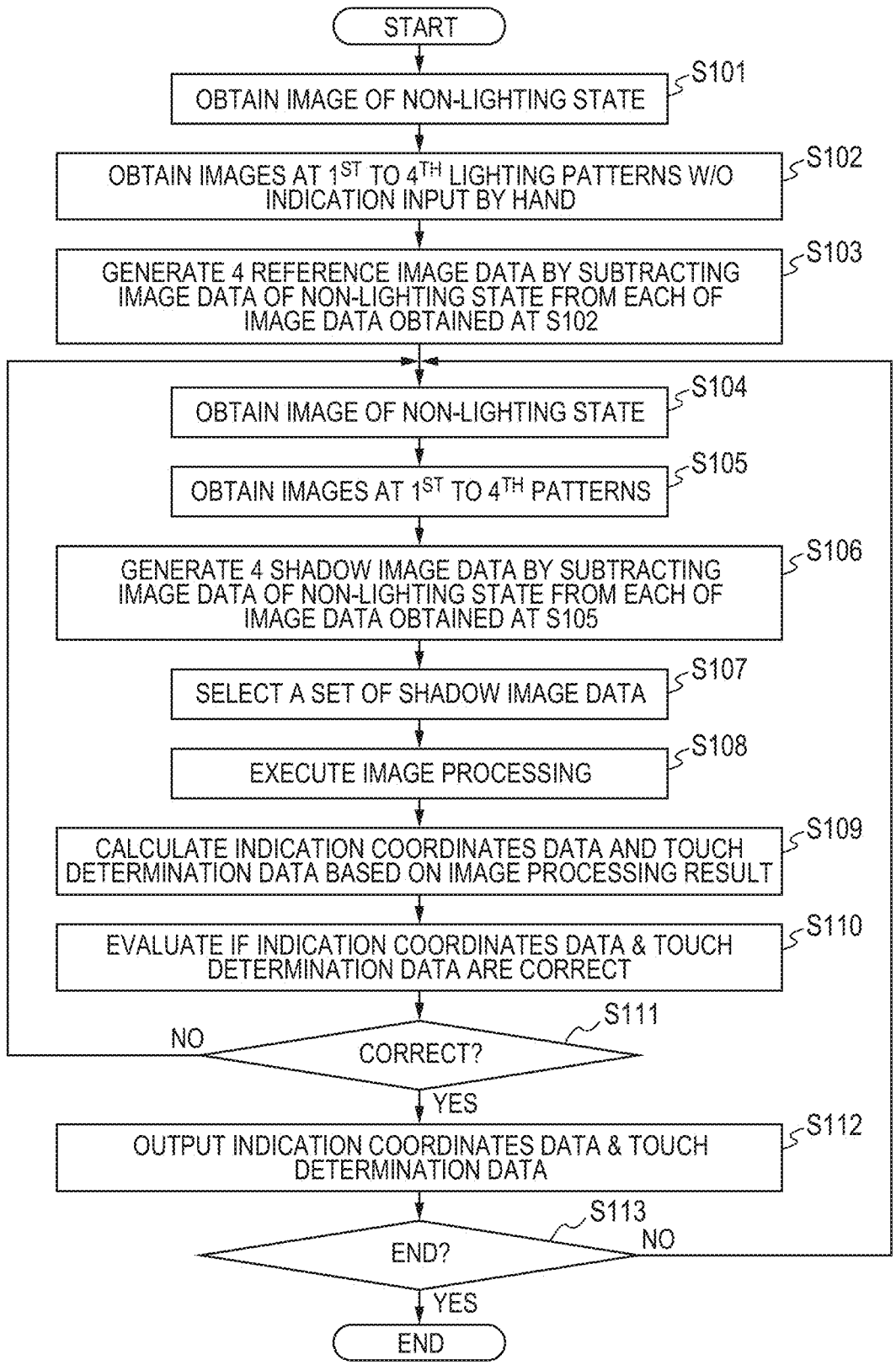
FIG. 5 is a flowchart illustrating processes of the image projecting system according to the first embodiment of the present invention.

FIG. 5 is a flowchart illustrating processes of the image projecting system according to this embodiment. In FIG. 5, steps S101 to S103 are processes of obtaining reference image data. The processes are executed under a condition where no operation is performed by a hand. Processes at and after step S104 are normal sampling processes to be executed in a state where an operation by the hand is performed, and repeated in a loop until the end.

At step S101, the image sensing device 1 performs a process of obtaining images in a state where light is not projected by the first to fourth lighting devices 2 to 5. At step S102, the image sensing device 1 performs a process of obtaining images in a state where no indication input by a hand is performed and light is projected by the first to fourth lighting devices 2 to 5. Here, the process of obtaining images is performed in the state where light is projected with first to fourth lighting patterns. At step S103, the first image processing unit 63 generates four pieces of reference image data by subtracting the pieces of image data taken at step S101 from each of the pieces of image data taken at step S102 that are correspond to first to fourth lighting patterns. This process is an example of a process in a reference image data generation unit.

At step S104, the image sensing device 1 performs a process of obtaining images in a state where light is not projected by the first to fourth lighting devices 2 to 5. At step S105, the image sensing device 1 performs a process of obtaining images in a state where an indication input by the hand is performed and light is projected by the first to fourth lighting devices 2 to 5. Here, the process of obtaining images is performed in the state where light is projected with the first to fourth lighting patterns.

At step S106, the first image processing unit 63 generates four pieces of shadow image data by subtracting the pieces of image data taken at step S104 from each of the pieces of image data corresponding to the first to fourth lighting patterns taken at step S105. This process is an example of a process in a shadow image data generation unit. At step S107, the first image processing unit 63 selects a set of (two) pieces of shadow image data from among the four pieces of shadow image data generated at step S106. At step S108, the second image processing unit 64 performs after-mentioned image processing.

At step S109, the second image processing unit 64 calculates indication coordinates data and touch determination data, based on a result of image processing. At step S110, the control unit 61 evaluates if the indication coordinates data and touch determination data calculated at step S109 are correct. At step S111, the control unit 61 determines whether the indication coordinates data and the touch determination data are correct or not, according to correctness evaluation at step S110. If the indication coordinates data and the touch determination data are correct, the process proceeds to step S112. In contrast, if the indication coordinates data and the touch determination data are not correct, the process returns to step S104. At step S112, the coordinates/touch state transmission unit 66 transmits the indication coordinates data and the touch determination data to a PC or the like. The control unit 61 determines whether to accept an indication for finishing the process from the user or not. If the indication for finishing the process is accepted, the process is finished. In contrast, if the indication for finishing the process is not accepted, the process returns to step S104.

Next, a process of selecting a set of pieces of image data at step S106 will be described in detail. In this embodiment, plural pieces of shadow image data corresponding to the first to fourth lighting patterns are generated. An optimal set of pieces of shadow image data in which shadow images are not shaded by the hand or arm of the user is selected from among the pieces of data.

Figure 6:
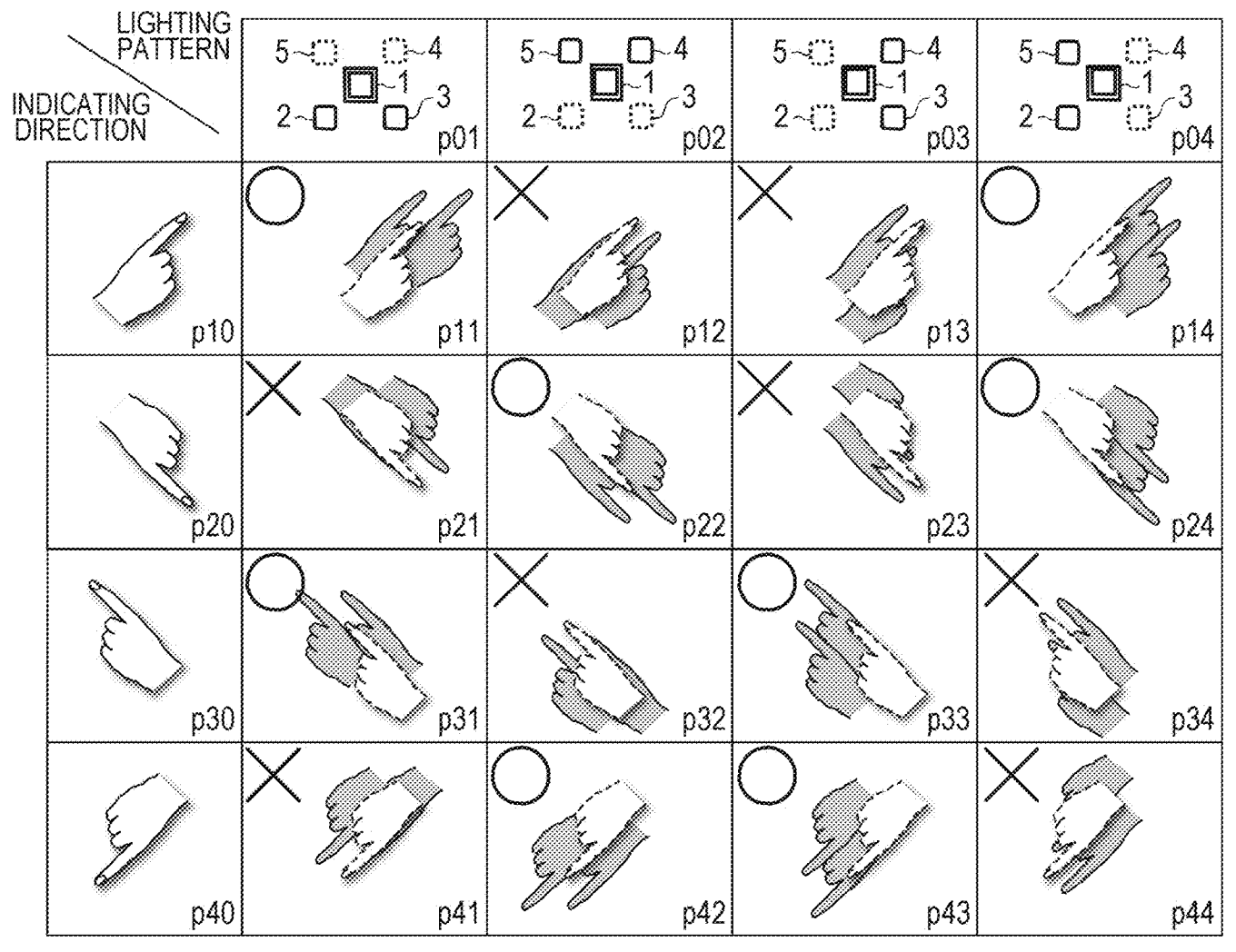

Here, the first to fourth lighting patterns are illustrated as respective patterns p01 to p04 in FIG. 6. For instance, if an indication input by a hand is performed in a direction as illustrated with a pattern p10, the pieces of shadow image data for the respective lighting patterns are as illustrated with patterns p11 to p14. The patterns p12 and p13 correspond to pieces of shadow image data in which particularly parts of fingers in the shadow images are shaded by a real image of the hand and invisible. In contrast, the patterns p11 and p14 correspond to pieces of shadow image data in which particularly parts of fingers in the shadow images are sufficiently visible. In such cases, the patterns p11 and p14 are selected. Likewise, hereinafter, even in the case where indication inputs by a hand is performed in a direction as illustrated with the patterns p20, p30 and p40, pieces of shadow image data in states where particularly parts of fingers in shadow images are sufficiently visible (acceptable patterns shown with a circle) are adopted.

A piece of non-lighting state image data R0 is data taken at step S101 in a state where light is not projected by the first to fourth lighting devices 2 to 5. Pieces of image data R1 to R4 are data taken at step S102 in a state where no indication input by a hand is performed and light is projected by the first to fourth lighting devices 2 to 5 with the first to fourth lighting patterns. At step S103, pieces of reference image data Ref1 to Ref4 from which ambient light is removed are generated by subtracting the non-lighting state image data R0 from the image data R1 to R4. The processes are represented in following Expressions 1-1 to 1-4.

$$Ref1 = R1 - R0 \qquad \text{Expression 1-1}$$

$$Ref2 = R2 - R0 \qquad \text{Expression 1-2}$$

$$Ref3 = R3 - R0 \qquad \text{Expression 1-3}$$

$$Ref4 = R4 - R0 \qquad \text{Expression 1-4}$$

A piece of non-lighting state image data A0 is data taken at step S104 in the state where light is not projected by the first to fourth lighting devices 2 to 5. Pieces of image data A1 to A4 are data taken at step S105 in the state where no indication input by a hand is performed and light is projected by the first to fourth lighting devices 2 to 5 with the first to fourth lighting patterns. At step S106, pieces of shadow image data K1 to K4 in a normal sample from which ambient light is removed are generated by subtracting the non-lighting state image data A0 from the image data A1 to A4. The processes are represented in following Expressions 2-1 to 2-4.

$$K1 = A1 - A0 \qquad \text{Expression 2-1}$$

$$K2 = A2 - A0 \qquad \text{Expression 2-2}$$

$$K3 = A3 - A0 \qquad \text{Expression 2-3}$$

$$K4 = A4 - A0 \qquad \text{Expression 2-4}$$

At step S106, the set of (two) pieces of shadow image data are selected. Here, it is assumed that the pieces of shadow image data K1 and K2 are selected. The processes at and after step S107 are executed only on pieces of image data with subscripts 1 and 2. The selection of the set of pieces of shadow image data may be performed at a stage where the pieces of image data A1 to A4 are obtained at step S105.

Next, the image processing at step S108 will be described in detail. At step S108, first, the second image processing unit 64 normalizes the set of pieces of shadow image data selected at step S107 with the reference image data generated at step S103. In actuality, it is useful to treat data in the state with a shadow as data having a positive direction.

Accordingly, the data is inverted and normalized to generate pieces of "normalized shadow image data" KN1 and KN2. The processes are represented in following Expressions 3-1 to 3-2.

$$KN1=(Ref1-K1)/Ref1 \qquad \text{Expression 3-1}$$

$$KN2=(Ref2-K2)/Ref2 \qquad \text{Expression 3-2}$$

Next, the second image processing unit 64 performs a process of binarizing each of pieces of normalized shadow image data KN1 and KN2. Binarization of the pieces of normalized shadow image data KN1 and KN2 generates pieces of shadow region image data KB1 and KB2 that only include position information but do not include level information. The processes are represented in following Expressions 4-1 to 4-2. These processes are an example of a process in a shadow region image data generation unit.

$$KB1=\text{Slice}(KN1) \qquad \text{Expression 4-1}$$

$$KB2=\text{Slice}(KN2) \qquad \text{Expression 4-2}$$

where the function Slice( ) returns one if input image data exceeds a prescribed threshold, and returns zero if the data does not exceed the threshold, on each pixel.

Next, the second image processing unit 64 applies an OR operation to two pieces of shadow region image data to generate OR shadow region image data. The process is represented in following Expression 5. This process is an example of a process in an OR shadow region image data generation unit.

$$KG=KB1 \lor KB2 \qquad \text{Expression 5}$$

Here, referring to FIGS. 7A to 7D, the meaning of the flow of the original image data (shadow image data)→the normalized shadow image data→the shadow region image data→the OR shadow region image data will be described. For intuitive recognition, FIGS. 7A to 7D illustrates each piece of image data in a state where the image is inverted and the shadow is displayed in black.

Figure 7:
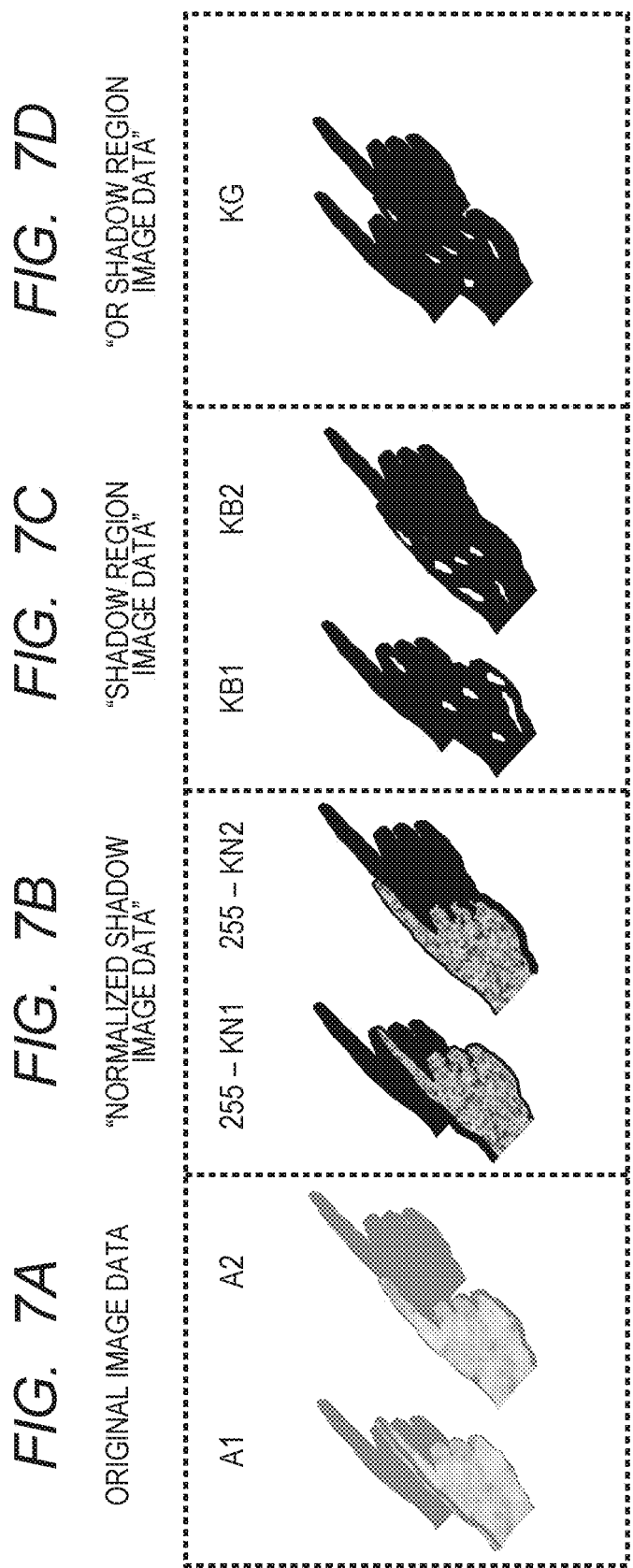
FIGS. 7A, 7B, 7C and 7D are diagrams for illustrating meaning of a flow of original image data (shadow image data), normalized shadow image data, shadow region image data, and OR shadow region image data.

FIG. 7A illustrates the original image data. The normalized shadow image data is obtained by normalizing the original image data with the reference image data (in detail, normalized and inverted). Each piece of the image data includes a part clearly corresponding to a shadow owing to lighting and a part unclear owing to reflection of the hand. FIGS. 7A and 7B use textures to represent the parts. In FIG. 7C, the image is binarized. Accordingly, some unclear parts are white and black patchy according to the positions. As illustrated in FIGS. 7A and 7B, in the unclear part, positions having a dark tendency are different according to the lighting direction. There is a tendency that, if anything, a side near a part clearly represented as a shadow is dark. Accordingly, the binary image data in FIG. 7C has a tendency that white parts reside opposite to parts clearly represented as shadows owing to lighting. FIG. 7D illustrates OR of the two images in FIG. 7C (representation in FIGS. 7A to 7D are inverted). According to such OR, difference in white positions in FIG. 7C is effective such that FIG. 7D has smaller white parts. In the OR shadow region image data in FIG. 7D, a part mainly in the direction of a finger, that is, a front area is reliably in a clearly black state. A rear partially patchy part is also seen to be totally encircled by black regions. This embodiment effectively utilizes the characteristics, and detects two positions of the finger from the OR shadow region image data.

Figure 8:
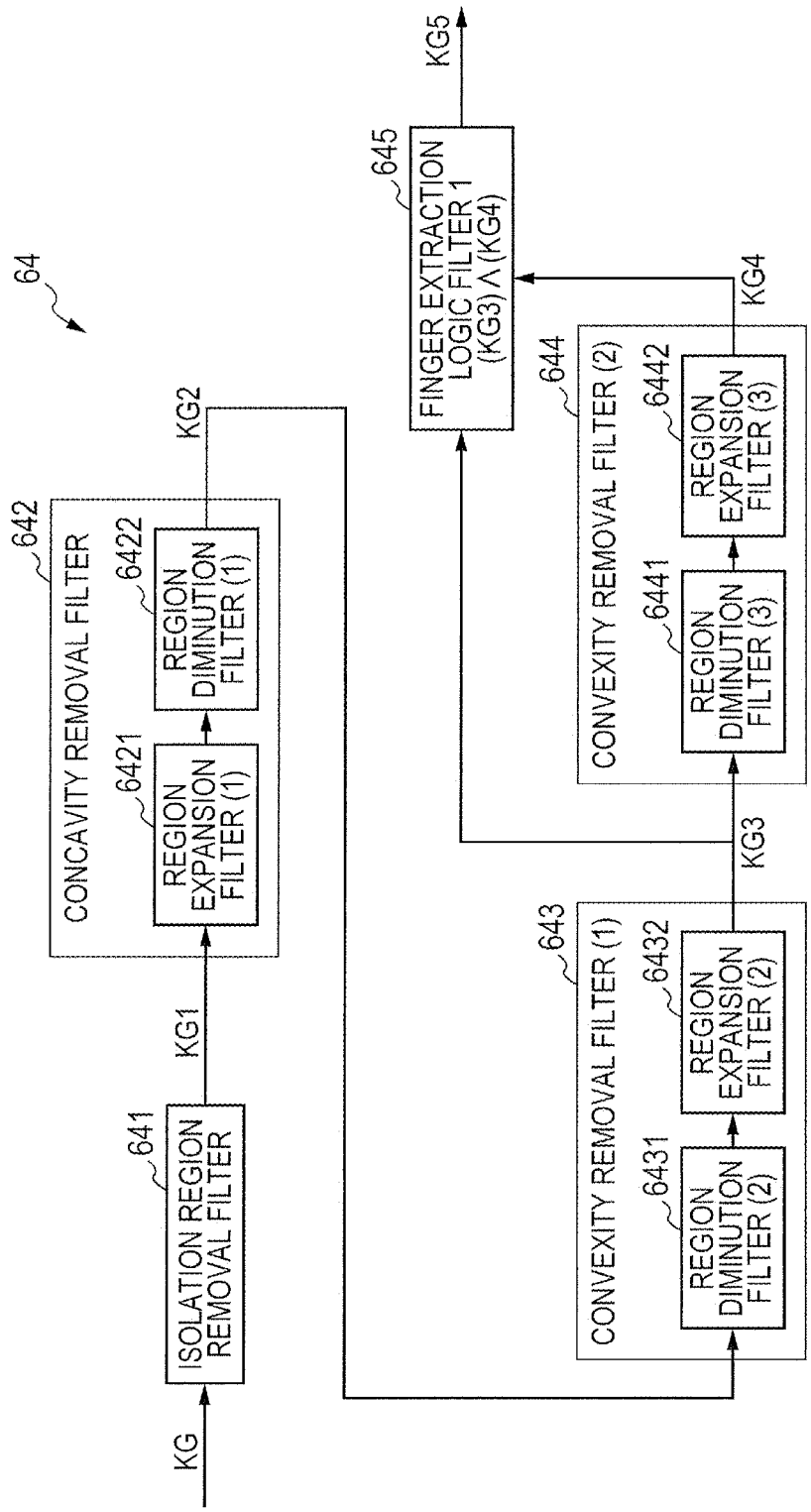
FIG. 8 is a diagram illustrating a configuration pertaining to a process of calculating indication coordinates data and touch determination data from the OR shadow region image data in a second image processing unit.
Figure 9:
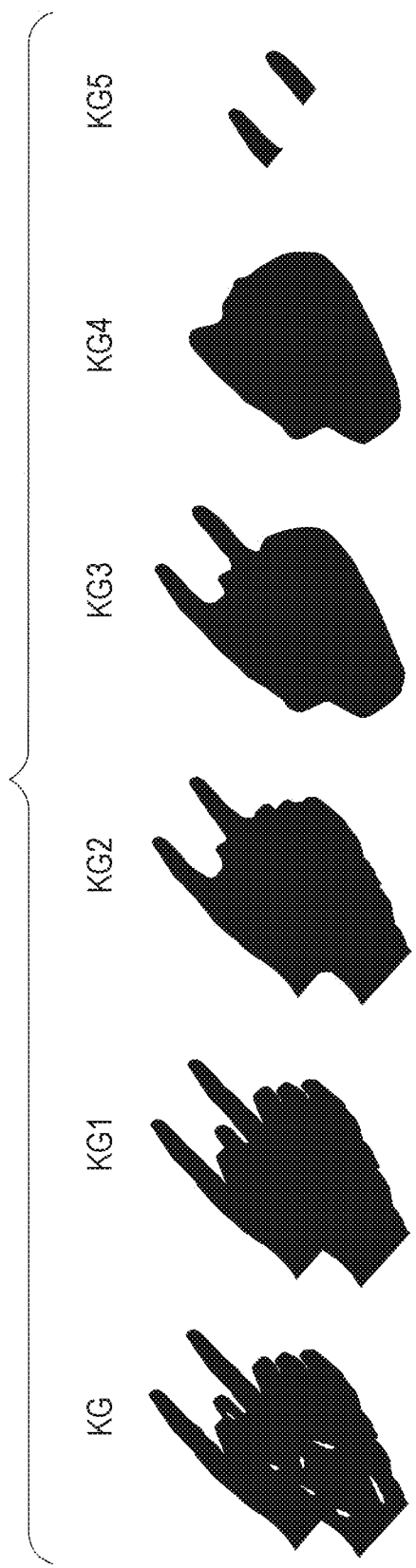
FIG. 9 is a diagram illustrating image data generated in each configurational element illustrated in FIG. 8.

Next, the second image processing unit 64 further performs image processing based on the OR shadow region image data, and calculates two positions P1 and P2 to calculate the indication coordinates data and the touch determination data. FIG. 8 is a diagram illustrating a configuration pertaining to a process of calculating the indication coordinates data and the touch determination data from the OR shadow region image data in the second image processing unit 64. FIG. 9 is a diagram illustrating image data generated in each configuration illustrated in FIG. 8. For intuitive recognition as with FIGS. 7A to 7D and FIG. 8 also illustrates each piece of image data such that the image is inverted and the shadow is represented in black. In FIG. 8, image data input into the second image processing unit 64 is OR shadow region image data KG.

As illustrated in FIG. 8, the second image processing unit 64 includes an isolation region removal filter 641, a concavity removal filter 642, a convexity removal filter 643, a convexity removal filter 644 and a finger extraction logic filter 645.

The isolation region removal filter 641 removes an isolation region based on the unclear part of the input image data (OR shadow region image data) KG described with reference to FIGS. 7A to 7D, and outputs image data KG1. The concavity removal filter 642 output image data KG2 in which sharp concaves in the image data KG1 are covered to be smoothed. The convexity removal filter (1) 643 outputs image data KG3 in which sharp points in the image data KG2 are removed and to be smoothed. The convexity removal filter (2) 644 outputs image data KG4 in which sticking-out parts of the image data KG3 with a spatial frequency equivalent to that of the finger is removed. The finger extraction logic filter 645 outputs finger image data KG5 obtained by removing the image data KG4 without the finger from the image data KG3 with the finger to extract the part of the finger. The logical expression of the finger extraction logic filter 645 is following Expression 6.

$$KG5=(KG3) \land (KG4) \qquad \text{Expression 6}$$

The isolation region removal filter 641, the concavity removal filter 642 and the convexity removal filter (1) 643 have a function of removing noise for detecting a finger shape. The convexity removal filter (2) 644 has a function of temporarily removing the finger part and outputting the image data KG4 to be input into the finger extraction logic filter 645. Each of the concavity removal filter 642, the convexity removal filter (1) 643 and the convexity removal filter (2) 644 is a region expansion/diminution filter configured by combining the region expansion filter and the region diminution filter with each other.

Figure 10A:
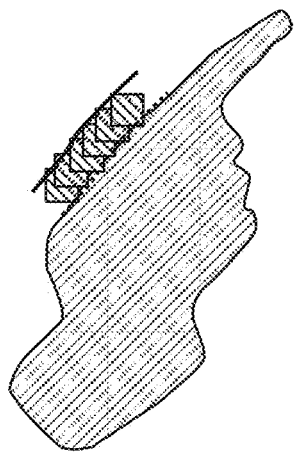
FIGS. 10A and 10B are diagrams for illustrating a region expansion filter and a region diminution filter.
Figure 10B:
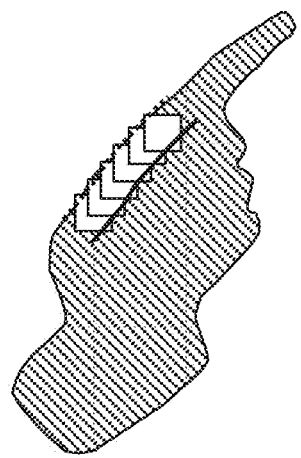

Next, referring to FIGS. 10A and 10B, the above-described region expansion filter and region diminution filter will be described. The region expansion filter defines a reference region associated with a prescribed number of taps. If the region includes at least one pixel in the original region (represented with oblique lines in FIGS. 10A and 10B, all the pixels in the reference region are set to have a luminance identical to that of the original region. The processes are sequentially performed by scanning the reference region on the entire screen or a prescribed region, according to a step of a unit of a pixel. The region diminution filter defines a reference region associated with a prescribed number of taps. If the region includes at least one pixel in a region outside of the original region (represented with oblique lines in FIGS. 10A and 10B, all the pixels in the reference region are set to have a luminance identical to that of the outside region. The reference region is sequentially processed by scanning the entire screen or a prescribed region, according to a step of a unit of a pixel. Application of the region expansion filter and subsequent application of the region diminution filter associated with the same number of taps allow the concaves in the region to be covered. The large number of taps has a covering effect on a large concave. The small number of taps has a covering effect on a small concave. In contrast, application of the region diminution filter and subsequent application of the region expansion filter associated with the same number of taps allow the convex parts in the region to be removed. The large number of taps allows a large convex to be removed. The small number of taps allows a small convex to be removed.

In this embodiment, a region expansion filter (1) 6421 and a region diminution filter (1) 6422 in the concavity removal filter 642 are associated with the same number of taps, which is Tp1=10. A region diminution filter (2) 6431 and a region expansion filter (2) 6432 in the convexity removal filter (1) 643 are associated with the same number of taps, which is Tp2=10. Here, Tp1 and Tp2 do not necessarily have the same value.

In the convexity removal filter (2) 644, image data KG4 is required to be a little larger, in order not to leave noise owing to masking in the finger extraction logic filter 645. Accordingly, the number of taps of a region diminution filter (3) 6441 is set such that TP3_1=40, and the number of taps of a region expansion filter (3) 6442 is set such that Tp3_2=50.

According to the numbers Tp1, Tp2, Tp3_1 and Tp3_2, each application is optimized in consideration of the size of a shadow to be treated and the pixel resolution of the obtained image data, thereby allowing stable detection of a finger. In the case where more importance is attached to the performance than to calculation time and packaging cost, the convexity removal filter and the concavity removal filter may be redundantly stacked in plural stages instead of one stage. Appropriate selection of the number of taps allows better image processing to be achieved.

Figure 11:
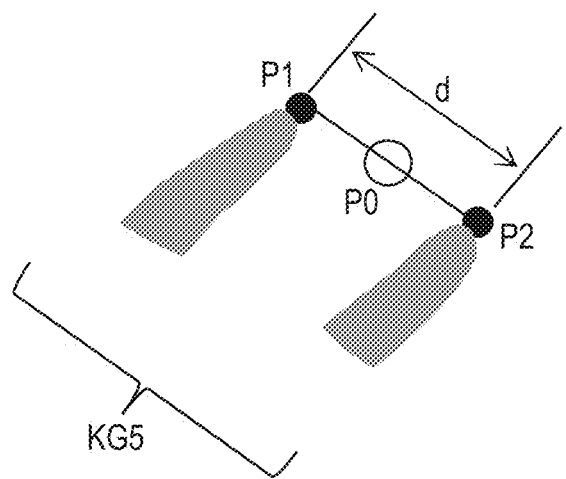
FIG. 11 is a diagram for illustrating a process of calculating P1 and P2 from finger image data.

As illustrated in FIG. 11, the second image processing unit 64 calculates P1 and P2 from the finger image data KG5. For instance, the opposite ends of each finger image (protrusion) are calculated, and one of the ends apart from the center of gravity of image data KG4 is selected, thus calculating P1 and P2. The distance between P1 and P2 is a distance d. Here, a first threshold d1 is for determining presence or absence of a coordinate input, and a second threshold d2 is for determining presence or absence of touchdown.

If d1<d, the coordinates/touch state transmission unit 66 in FIG. 3 transmits no data.

If d2<d≤d1, the coordinates/touch state transmission unit 66 transmits the indication coordinates data representing the coordinate value P0 together with touch determination data representing "no touchdown".

If d≤d2, the coordinates/touch state transmission unit 66 transmits the indication coordinates data representing the coordinate value P0 together with the touch determination data representing "presence of touchdown".

Figure 12:
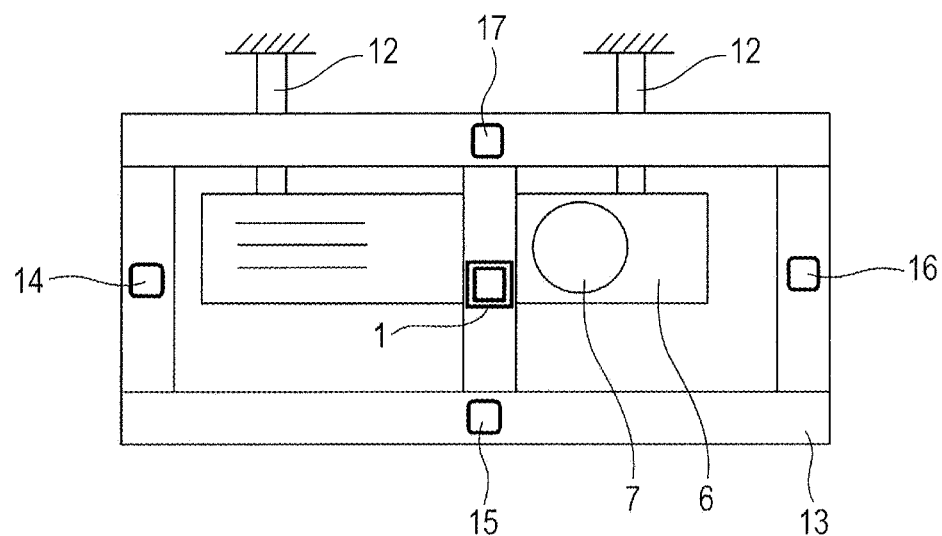
FIG. 12 is a diagram illustrating a configuration of an image projecting system according to a second embodiment of the present invention.

Next, a second embodiment of the present invention will be described. FIG. 12 is a diagram illustrating a configuration of an image projecting system according to the second embodiment. As illustrated in FIG. 12, in the image projecting system according to the second embodiment, first to fourth lighting devices 14 to 17 are arranged at positions different from those of the first to fourth lighting devices 2 to 5 of the image projecting system according to the first embodiment. Other configurational elements of the image projecting system according to this embodiment are equivalent to those of the image projecting system according to the first embodiment. Such arrangement of the first to fourth lighting devices 14 to 17 allows an appropriate piece of shadow image data to be selected from pieces of shadow image data different from those of the first embodiment illustrated in FIG. 6.

Figure 13:
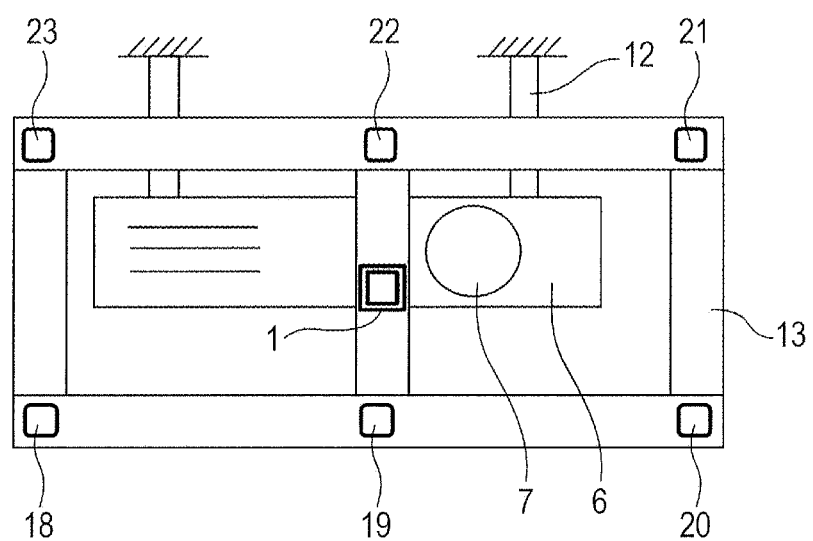
FIG. 13 is a diagram illustrating a configuration of an image projecting system according to a third embodiment of the present invention.

Next, a third embodiment of the present invention will be described. FIG. 13 is a diagram illustrating a configuration of an image projecting system according to the third embodiment. As illustrated in FIG. 13, the image projecting system according to the third embodiment includes more lighting devices than the image projecting system according to the first embodiment does, and has a wider arrangement width of the lighting device in the lateral direction than the image projecting system according to the first embodiment has. Other configurational elements of the image projecting system according to this embodiment are equivalent to those of the image projecting system according to the first embodiment. Thus, this embodiment adopts a mode other than that of the first embodiment illustrated in FIG. 6, and can select an appropriate piece of shadow image data from among alternative pieces of shadow image data more than that of the first embodiment. That is, the third embodiment can select an appropriate piece of shadow image data from among more various pieces of shadow image data than those of the first embodiment.

Figure 14:
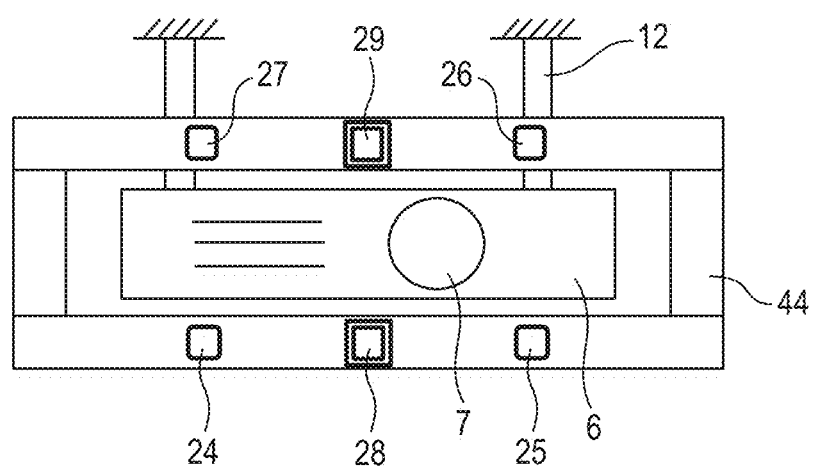
FIG. 14 is a diagram illustrating a configuration of an image projecting system according to a fourth embodiment of the present invention.

Next, a fourth embodiment of the present invention will be described. FIG. 14 is a diagram illustrating a configuration of an image projecting system according to the fourth embodiment. As illustrated in FIG. 14, the image projecting system according to the fourth embodiment includes a plurality of image sensing devices 28 and 29. Other configurational elements of the image projecting system according to this embodiment are equivalent to those of the image projecting system according to the first embodiment. In this embodiment, the image sensing devices 28 and 29 and the lighting devices 24 to 27 are required to be arranged substantially in proximity to the image projecting unit 7 of the projector 6. The lighting devices 24 to 27 are required to be separated from each other by certain distances, or the lighting devices 24 to 27 are required to be separated from the image sensing devices 28 and 29 by certain distances. This configuration is adopted to sufficiently characterize the group of pieces of shadow image data from which an appropriate piece of shadow image data is to be selected, as illustrated in FIG. 6. More specifically, for the distances between the lighting devices 24 to 27 and the image sensing devices 28 and 29, this embodiment is suitable in one of the case where the supporters in the configurations of the first to third embodiments are insufficient, and the case where the supporters that can be separated by a sufficient distance interfere or obstruct the view owing to their large size.

According to this embodiment, for instance, for the lighting pattern p01 in FIG. 6, the image sensing device 29 is selected. Likewise, for the lighting pattern p02 in FIG. 6, the image sensing device 28 is selected. Accordingly, a supporter 44 only requires a vertical dimension half as large as that of the supporter 13 of the first embodiment, thus downsizing the entire apparatus. This configuration negates the need to arrange the image sensing device at the center of the four lighting devices. This supporter 44 thus negates the need to form a bridge part at the center, which is formed in the supporter 13 of the first embodiment. In the case of arrangement with the projector 6, the degree of freedom in arrangement is increased.

Figure 15:
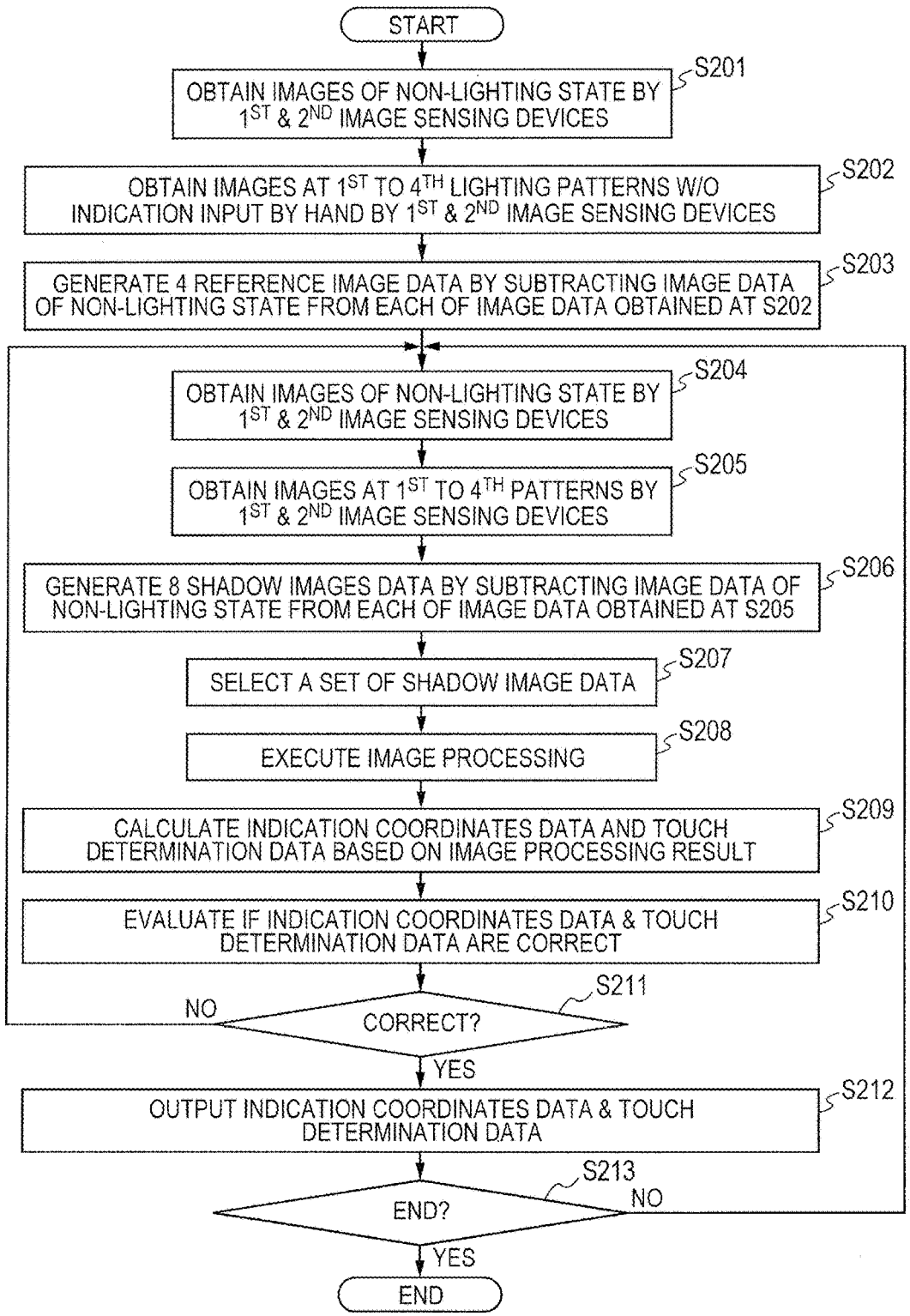
FIG. 15 is a flowchart illustrating processes of the image projecting system according to the fourth embodiment of the present invention.

FIG. 15 is a flowchart illustrating a process of the image projecting system according to the fourth embodiment.

Since steps S208 to S213 in FIG. 15 are processes equivalent to those in steps S108 to S113 in FIG. 5, the description thereof is omitted.

At step S201, the image sensing device 28 and the image sensing device 29 execute a process of obtaining images in the state where light is not projected by the first to fourth lighting devices 2 to 5. At step S202, the image sensing device 28 and the image sensing device 29 execute the process of obtaining images in the state where no indication input by a hand is performed and light is projected by the first to fourth lighting devices 2 to 5 with the first to fourth lighting patterns. At step S203, the first image processing unit 63 generates four pieces of reference image data by subtracting the pieces of image data taken at step S201 from each of the pieces of image data corresponding to first to fourth lighting patterns taken at step S202.

At step S204, the image sensing device 28 and the image sensing device 29 execute the process of obtaining images in the state where light is not projected by the first to fourth lighting devices 2 to 5. At step S205, the image sensing device 28 and the image sensing device 29 execute the process of obtaining images in the state where indication input is performed by a hand and light is projected by the first to fourth lighting devices 2 to 5 with the first to fourth lighting patterns. At step S206, the first image processing unit 63 generates eight pieces of shadow image data by subtracting the pieces of image data taken at step S204 from each of the pieces of image data corresponding to the first to fourth lighting patterns taken at step S205. At step S207, the first image processing unit 63 selects a set of (two) pieces of shadow image data from among eight pieces of shadow image data generated at step S206. Thereafter, steps S208 to S213, which are equivalent to steps S108 to S113 in FIG. 5, are executed.

Figure 16:
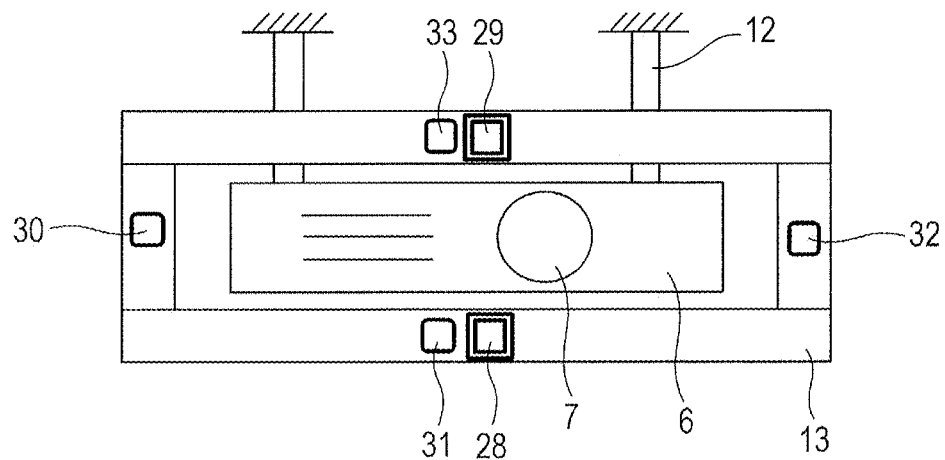
FIG. 16 is a diagram illustrating a configuration of an image projecting system according to a fifth embodiment of the present invention.

A fifth embodiment of the present invention will be described. FIG. 16 is a diagram illustrating a configuration of an image projecting system according to the fifth embodiment. As illustrated in FIG. 16, the image projecting system according to the fifth embodiment is different in positions of the lighting devices from the image projecting system according to the fourth embodiment; other configurational elements of the image projecting system according to this embodiment are equivalent to those of the image projecting system according to the first embodiment. The arrangement of the lighting devices 30 to 33 at the illustrated positions allows an appropriate piece of shadow image data to be selected from among pieces of shadow image data different in mode from those of the fourth embodiment.

Figure 17:
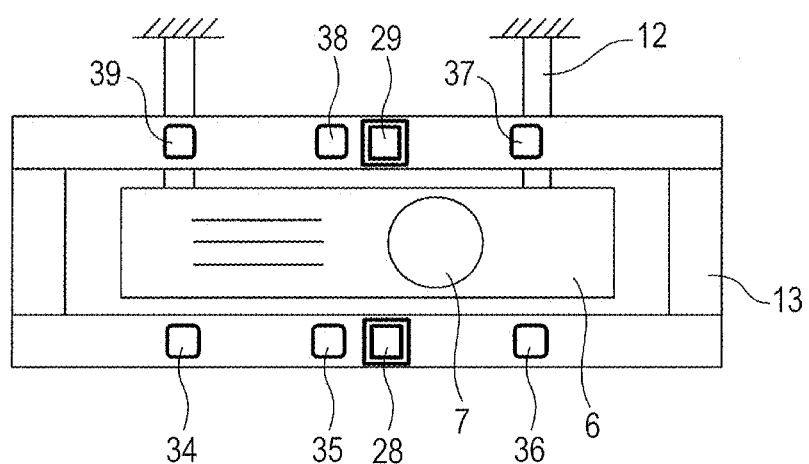
FIG. 17 is a diagram illustrating a configuration of an image projecting system according to a sixth embodiment of the present invention.

Next, a sixth embodiment of the present invention will be described. FIG. 17 is a diagram illustrating a configuration of an image projecting system according to the sixth embodiment. As illustrated in FIG. 17, the image projecting system according to the sixth embodiment includes more lighting devices than the image projecting system according to the fourth embodiment does, and has a wider arrangement width of the lighting device in the lateral direction than the image projecting system according to the fourth embodiment has. Other configurational elements of this embodiment are equivalent to those of the image projecting system according to the first embodiment. Accordingly, the image projecting system according to the sixth embodiment can select an appropriate piece of shadow image data from among pieces of shadow image data which are different in mode from those of the fourth embodiment and which include alternatives more than those of the fourth embodiment. That is, the sixth embodiment can select an appropriate piece of shadow image data from among the pieces of shadow image data more various than those of the fourth embodiment.

Figure 18:
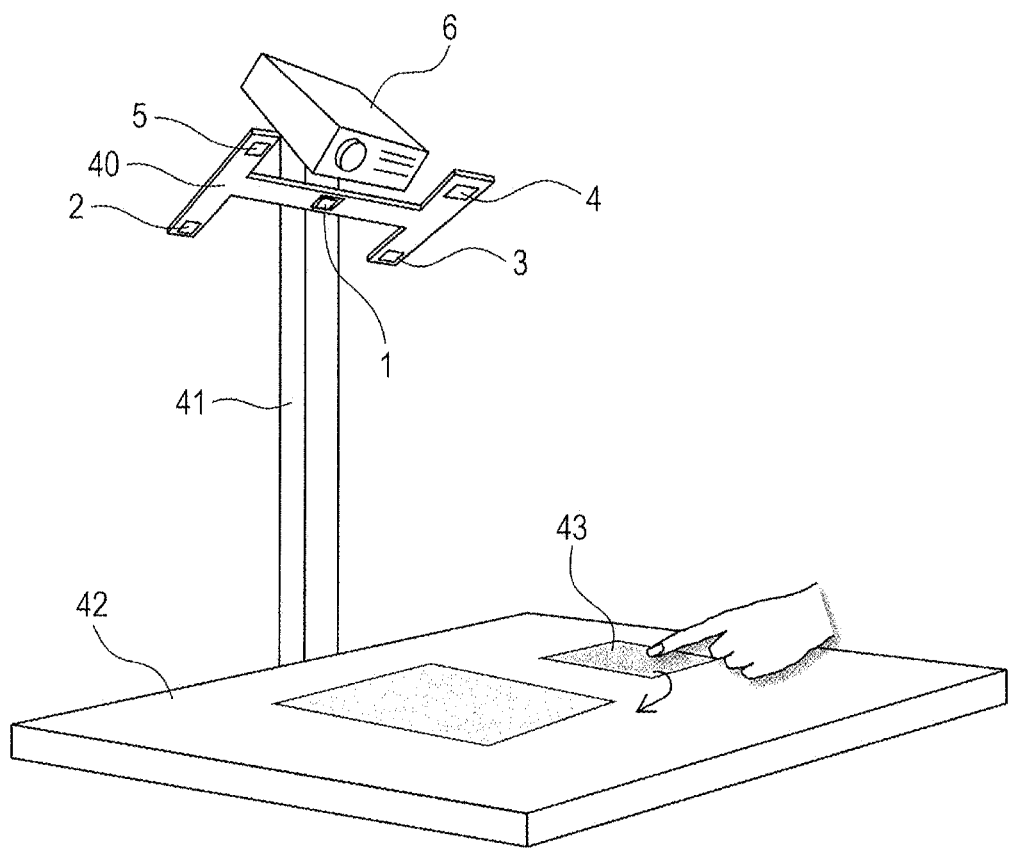
FIG. 18 is a diagram illustrating a configuration of an image projecting system according to a seventh embodiment of the present invention.

Next, a seventh embodiment of the present invention will be described. FIG. 18 is a diagram illustrating a configuration of an image projecting system according to the seventh embodiment. As illustrated in FIG. 18, the image projecting system according to the seventh embodiment is classified into a type that projects an image on a table 42. Other configurational elements of this embodiment are equivalent to those of the image projecting system according to the first embodiment. The image projecting system according to the seventh embodiment projects an image on the table 42 while allowing touch input onto a menu in the image. For instance, an object 43 in the image can be moved by touch operation. In this embodiment, it is only required that a supporter 40 at which the image sensing device 1 and lighting devices 2 to 5 are arranged, and the projector 6 are attached to a stand 41. This configuration allows touch input without providing any special device for the table 42.

The above-described embodiments can reliably obtain a shadow image even in the case with ambient light, and correctly detect a touched position and presence or absence of a touchdown. The above-described embodiments detect a touched position and presence or absence of a touchdown, based on image data taken in a state where the plurality of lighting devices project light onto a screen. Accordingly, detection can be correctly performed even in the case where the positions and indications of a hand and an arm are in any direction.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-156904, filed Jul. 12, 2012, which is hereby incorporated by reference herein in its entirety.

What is claimed is:

1. A touch detection apparatus, comprising:
    a plurality of lighting units configured to emit light including invisible wavelength components onto a screen;
    a control unit configured to control the emission of light from the plurality of lighting units according to a plurality of lighting patterns including:
    a first lighting pattern to cause one or more of the plurality of lighting units associated with a first group to emit light such that a shadow of an object is formed at a first position on the screen; and
    a second lighting pattern to cause one or more of the plurality of lighting units associated with a second group to emit light such that the shadow of the object is formed at a second position on the screen, the second position being different from the first position, wherein at least one of the plurality of lighting units associated with the second group is different from the plurality of lighting units associated with the first group;

an image sensing unit configured to obtain, according to control by the control unit, a plurality of captured images of the screen including:

a first captured image of the screen, where the shadow of the object is formed at the first position, being lighted by the one or more of the plurality of lighting units associated with the first group; and a second captured image of the screen, where the shadow of the object is formed at the second position, being lighted by the one or more of the plurality of lighting units associated with the second group, wherein the image sensing unit is configured to have a sensitivity to the invisible wavelength components of the light emitted from the plurality of lighting units; and a detection unit configured to detect a touch to the screen by the object based on the plurality of captured images including the first captured image of the screen, where the shadow of the object is formed at the first position, being lighted by the one or more of the plurality of lighting units associated with the first group and the second captured image of the screen, where the shadow of the object is formed at the second position, being lighted by the one or more of the plurality of lighting units associated with the second group.

2. The touch detection apparatus according to claim 1, wherein the detection unit detects a touch to the screen based on the plurality of captured images of the screen respectively obtained by a plurality of the image sensing units.

3. The touch detection apparatus according to claim 1, further comprising:

a shadow image data generation unit configured to generate shadow image data by performing subtraction between the plurality of captured images, including the first captured image and the second captured image, obtained by the image sensing unit with the light being emitted onto the screen from at least one of the plurality of lighting units, and image data obtained by the image sensing unit without the light being emitted onto the screen from any of the plurality of lighting units, wherein the detection unit detects a touch to the screen based on the shadow image data.

4. The touch detection apparatus according to claim 3, further comprising:

a reference image data generation unit configured to generate reference image data by performing subtraction between image data obtained by the image sensing unit without the light being emitted onto the screen from the plurality of lighting units or an object to be detected by the detection unit on the screen, and image data obtained by the image sensing unit with the light being emitted onto the screen from the plurality of lighting units and without the object on the screen; and a normalization unit configured to generate normalized shadow image data by normalizing the shadow image data using the reference image data, wherein the detection unit detects a touch to the screen based on the normalized shadow image data.

5. The touch detection apparatus according to claim 4, further comprising:

a shadow region image data generation unit configured to generate shadow region image data by binarizing the normalized shadow image data, wherein the detection unit detects a touch to the screen based on the shadow region image data.

6. The touch detection apparatus according to claim 5, further comprising:

an OR shadow region image data generation unit configured to generate OR shadow region image data by applying an OR operation to plural pieces of the shadow region image data, wherein the detection unit detects a touch to the screen based on the OR shadow region image data.

7. The touch detection apparatus according to claim 6, further comprising:

a calculation unit configured to calculate a distance between end points of two protruding shapes from the OR shadow region image data, wherein the detection unit detects a touch to the screen based on the distance calculated by the calculation unit.

8. The touch detection apparatus according to claim 1, wherein the detection unit detects at least any one of a touched position and a touchdown on the screen.

9. A touch detection method, comprising:

instructing a plurality of lighting units to emit light including invisible wavelength components onto a screen;

controlling the emission of light from the plurality of lighting units according to a plurality of lighting patterns including:

a first lighting pattern to cause one or more of the plurality of lighting units associated with a first group to emit light such that a shadow of an object is formed at a first position on the screen; and a second lighting pattern to cause one or more of the plurality of lighting units associated with a second group to emit light such that the shadow of the object is formed at a second position on the screen, the second position being a position different from the first position, wherein at least one of the plurality of lighting units associated with the second group is different from the plurality of lighting units associated with the first group;

image-sensing, according to control by the controlling, a plurality of captured images of the screen including:

a first captured image of the screen, where the shadow of the object is formed at the first position, being lighted by the one or more of the plurality of lighting units associated with the first group; and a second captured image of the screen, wherein the shadow of the object is formed at the second position, being lighted by the one or more of the plurality of lighting units associated with the second group, the image-sensing further including sensing the invisible wavelength components of the light emitted from the plurality of lighting units; and detecting a touch to the screen by the object based on the plurality of captured images including the first captured image of the screen, where the shadow of the object is formed at the first position, being lighted by the one or more of the plurality of lighting units associated with the first group and the second captured image of the screen, where the shadow of the object is formed at the second position, being lighted by the one or more of the plurality of lighting units associated with the second group.

10. A non-transitory computer-readable recording medium having recorded therein a program for causing a computer to execute:
  instructing a plurality of lighting units to emit light including invisible wavelength components onto a screen;
  controlling the emission of light from the plurality of lighting units according to a plurality of lighting patterns including:
  a first lighting pattern to cause one or more of the plurality of lighting units associated with a first group to emit light such that a shadow of an object is formed at a first position on the screen; and
  a second lighting pattern to cause one or more of the plurality of lighting units associated with a second group to emit light such that the shadow of the object is formed at a second position on the screen, the second position being a position different from the first position,
  wherein at least one of the plurality of lighting units associated with the second group is different from the plurality of lighting units associated with the first group;
  image-sensing, according to control by the controlling, a plurality of captured images of the screen including:
  a first captured image of the screen, where the shadow of the object is formed at the first position, being lighted by the one or more of the plurality of lighting units associated with the first group; and
  a second captured image of the screen, where the shadow of the object is formed at the second position, being lighted by the one or more of the plurality of lighting units associated with the second group,
  the image-sensing further including sensing the invisible wavelength components of the light emitted from the plurality of lighting units; and
  detecting a touch to the screen by the object based on the plurality of captured images including the first captured image of the screen, where the shadow of the object is formed a the first position, being lighted by the one or more of the plurality of lighting units associated with the first group and the second captured image of the screen, where the shadow of the object is formed at the second position, being lighted by the one or more of the plurality of lighting units associated with the second group.

* * * * *